United States Patent [19]

Frederich

[11] Patent Number: 4,628,460
[45] Date of Patent: Dec. 9, 1986

[54] MICROPROCESSOR CONTROLLED PHASE SHIFTER

[75] Inventor: William L. Frederich, Kenosha, Wis.

[73] Assignee: Eaton Corporation, Cleveland, Ohio

[21] Appl. No.: 419,285

[22] Filed: Sep. 17, 1982

[51] Int. Cl.$^4$ .................. G06F 15/20; H02P 5/16; H02M 5/42
[52] U.S. Cl. .................. 364/480; 318/257; 318/314; 328/63; 363/87; 364/550
[58] Field of Search .................. 364/480, 481, 550; 318/257, 293, 308, 331, 345 E, 722, 314; 328/63; 307/261, 262; 187/29 R; 363/87, 129

[56] References Cited

U.S. PATENT DOCUMENTS

| | | | |
|---|---|---|---|
| 3,181,046 | 4/1965 | Sutton | 318/28 |
| 3,345,549 | 10/1967 | Hauser et al. | 318/227 |
| 3,413,534 | 11/1968 | Stringer | 318/308 |
| 3,431,479 | 3/1969 | Joslyn | 318/257 |
| 3,538,412 | 11/1970 | Graf et al. | 318/345 |
| 3,541,426 | 11/1970 | Joslyn et al. | 318/257 X |
| 3,551,782 | 12/1970 | Maynard | 318/257 X |
| 3,601,674 | 8/1971 | Joslyn et al. | 318/329 X |
| 3,795,850 | 3/1974 | Grygera | 318/257 X |
| 3,947,737 | 3/1976 | Kimura et al. | 318/257 |
| 4,090,116 | 5/1978 | Lippitt | 318/345 E |
| 4,263,557 | 4/1981 | Jarvinen | 318/314 X |
| 4,277,825 | 7/1981 | Johnson | 318/257 X |
| 4,286,222 | 8/1981 | Caputo | 328/63 X |
| 4,286,315 | 8/1981 | Johnson | 318/345 E X |
| 4,290,108 | 9/1981 | Woehrle et al. | 364/480 |
| 4,337,509 | 6/1982 | Omae et al. | 318/345 E X |
| 4,347,562 | 8/1982 | Galloway | 363/87 |
| 4,416,352 | 11/1983 | Husson et al. | 318/257 X |
| 4,441,063 | 4/1984 | Roof et al. | 318/802 X |

FOREIGN PATENT DOCUMENTS

| | | |
|---|---|---|
| 2055258 | 2/1981 | United Kingdom . |
| 2054986 | 2/1981 | United Kingdom . |
| 2056210 | 3/1981 | United Kingdom . |
| 2059194 | 4/1981 | United Kingdom . |
| 2067029 | 7/1981 | United Kingdom . |
| 1598918 | 9/1981 | United Kingdom . |

OTHER PUBLICATIONS

IEEE Trans. Ind. Electronics, Feb. 1982, (vol. IE-29, No. 1), "Microprocessor-Based Design of a Firing Circuit for 3-Phase Full Wave Thyristor Dual Converter", Tang et al, pp. 67-73.

IEEE Indus. Appl. Soc., 1981 Annual Meeting (10/5-9/81), "A Microprocessor-Based Controller for a 3-Phase Controlled Rectifier Bridge", Dewan et al, pp. 812-817.

Primary Examiner—Errol A. Krass
Assistant Examiner—Kevin J. Teska
Attorney, Agent, or Firm—C. H. Grace; M. L. Union

[57] ABSTRACT

A new method and apparatus for controlling the conversion of AC electrical energy into DC electrical energy. A microprocessor control system is operatively connected to an AC source and to a motor/regenerative switching bridge network. A control signal is operatively coupled to the microprocessor to selectively adjust the DC output voltage. The microprocessor monitors the control voltage, calculates the timing of gating signals and generates gating pulses to the bridge networks. The microprocessor also senses the phase rotation and the line frequency of the AC source and factors those parameters into account when determining gate pulse output pattern and timing.

10 Claims, 13 Drawing Figures

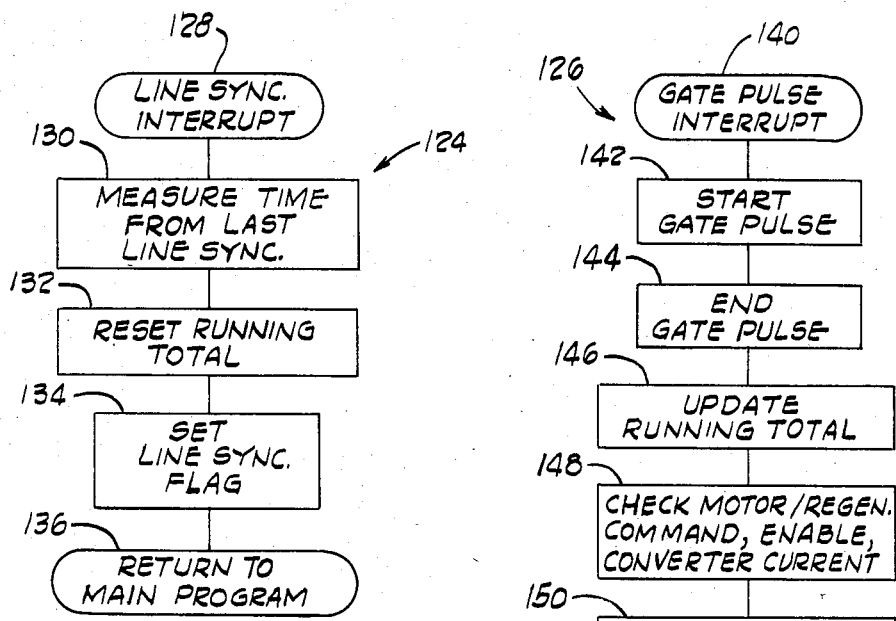
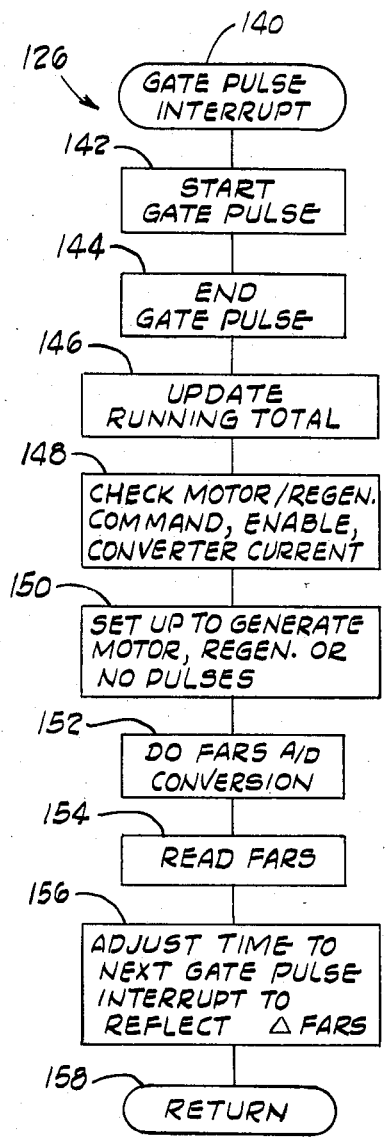
Fig. 5
Fig. 6

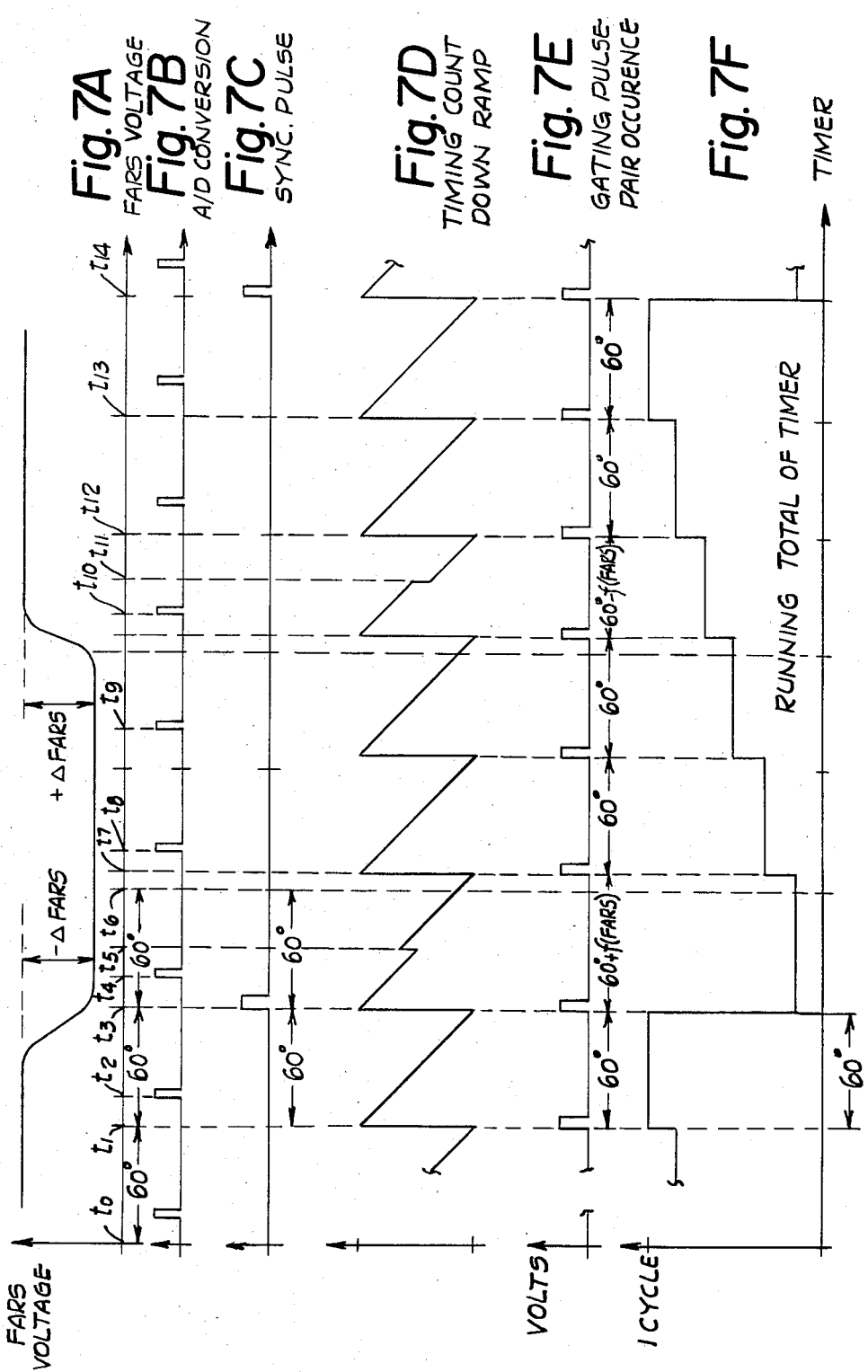

MICROPROCESSOR CONTROLLED PHASE SHIFTER

DESCRIPTION

1. Technical Field

The present invention relates to a method and an apparatus for converting AC electrical energy into DC electrical energy and is particularly directed to an apparatus and a method for automatically controlling a phase shifter to produce a DC electrical signal having a value responsive to a control signal and independent of the frequency and phase rotation of the AC electrical energy source.

2. Background Art

Converter circuits for converting an AC electrical signal into a DC electrical signal are known in the art. These types of circuits can be utilized in an inverter circuit or the front end portion of an adjustable frequency drive circuit. In addition, converter circuits can be utilized to drive DC loads such as motors. DC motors often require a variable amount of DC electrical energy to control the speed of the motor. Also, some DC motors function as generators during certain modes of operation. Therefore, the control circuit for such a DC motor must both act as a converter circuit to drive the motor and as a regenerative circuit to provide means to return the generated current from the motor to the AC electrical energy source. In accordance with prior art converters, an AC electrical energy source is connected to a plurality of switching devices, such as SCR's, which are in turn connected together in two bridge configurations. The conduction of the SCR's is controlled by firing signals or gating pulses generated by a control source. Commonly, one bridge configuration is provided for producing a DC electrical signal and a second bridge is provided for receiving DC electrical energy in the form of generated current and returning such energy to the AC electrical energy source. The one bridge that produces DC electrical energy is known as the motoring bridge and the other bridge that returns current to the AC electrical energy source is known as the regenerative bridge. Six gating pulse pairs are generated every cycle of the AC electrical energy. Circuits have been utilized to generate the gating pulses at predetermined phase angles with respect to the AC source and in a desired phase sequence. As the phase angle of the gating pulses vary, the resultant level of the DC output voltage varies. The phase angle of the gating pulses is determined by an analog command signal. Each circuit has a separate adjustment to calibrate the timing of each gating pulse with respect to the AC source. Previous designs have also required that either three or six matched and filtered line sync signals be utilized to control the timing of the six gating pulse pairs.

A problem with the prior art converters is the fact that six individual adjustments are required to adjust the timing of the gating pulses. Making such numerous adjustments is time consuming and tedious. If precision components are used to reduce or eliminate timing adjustments, the cost of the control circuit is increased.

Another problem with prior art converters is that the resultant level of the DC output voltage is dependent upon the frequency of the AC electrical energy source. Variations in the AC source line frequency causes variations in the level of the DC output voltage.

Still another problem with prior art converters is that they are phase rotation dependent. The typical AC electrical energy source is a three phase signal designated phases A, B and C. The rotation or the occurrence of the phases can be ABC or ACB. The converter will not operate properly when the phase rotation of the AC electrical energy source is changed from one sequence to another.

DISCLOSURE OF THE INVENTION

The present invention provides a new and improved converter circuit and a method for operating a converter circuit that converts AC electrical energy into DC electrical energy. The new method and apparatus in accordance with the present invention are designed to provide a DC electrical energy having a value which is responsive of a control signal without need of individual adjustments. The new method and apparatus are also designed to produce a DC electrical energy whose value is independent of the frequency of the AC electrical energy source and is independent of the phase rotation of the AC electrical energy source.

The method for controlling the conversion of AC electrical energy into DC electrical energy includes the step of providing switching means adapted to be operatively coupled to an AC electrical energy source. The switching means includes DC electrical energy output terminals. Another step is providing a controlling means adapted to be operatively coupled to the switching means and responsive to the AC electrical energy source. A control signal is established and directed to the controlling means indicative of a desired value of DC electrical energy from the switching means. The controlling means senses the control signal a predetermined number of times during a cycle of the AC electrical energy. Gating signals are generated by the controlling means responsive to determined timing of the gating signals and responsive to said AC electrical energy source to control the conduction states of the switching means. The timing of gating signals for the switching means are determined by said controlling means responsive to the control signal and to the AC electrical energy source for gating the switching means to produce a controllable DC electrical energy level.

A circuit for converting AC electrical energy into DC electrical energy made in accordance with the present invention comprises a switching means operatively coupled to an AC electrical energy source, the switching means including DC electrical energy output terminals. A controlling means is operatively coupled to the switching means and responsive to said AC electrical energy source for controlling conduction states of the switching means. The controlling means receives a control signal from a suitable source and determines the timing of gating pulses for said switching means responsive to the control signal and responsive to the AC electrical energy source to produce a DC electrical energy having a controllable value responsive to said control signal. The control means generates signals to the switching means responsive to the determined timing and the AC electrical energy source of the gating pulses.

In the preferred embodiment, a converter bridge and a regenerative bridge are operatively coupled to a three-phase AC electrical energy source. The two bridges comprise a plurality of SCR's operatively connected in switching pairs. A microprocessor is provided that is operatively coupled to the three-phase AC source and to the gates of the SCR's. A sensor is operatively coupled to the output terminals of the bridge network for sensing the current of the bridge. An analog, DC control voltage is provided to control the level of the converter output voltage. The control signal and a signal from the sensor are summed and integrated in a processing circuit. The resultant summation and integration from the processing circuit, which represents a firing angle reference signal, is operatively coupled to an A/D converter. The output of the A/D converter is operatively connected to the microprocessor. The microprocessor monitors the converted firing angle reference signal a predetermined number of times per cycle of the AC electrical energy. If six gating pulse pairs are to be generated, the microprocessor preferably monitors the firing angle reference signal between each gating pulse which is six times per cycle of the AC source. The microprocessor monitors the line frequency and the phase rotation of the three-phase AC signal. Using one of the three-phases as a synchronization signal, the microprocessor determines the timing of the gating pulses for the particular bridge to be driven based on the monitored frequency and the value of the control voltage. The microprocessor then generates gating signals to the selected bridge in a sequence dependent upon the monitored phase rotation. If the motoring bridge is selected, the bridge will output a DC signal having a value responsive to the control signal. The resultant DC signal is independent of the frequency and the phase rotation of the AC source. If the regenerative bridge is selected, the microprocessor will generate gating signals to the regenerative bridge to return generated energy to the AC line. If the control voltage value changes at any time, the microprocessor makes an adjustment in the timing of the next gating pulse pair to change the value of the DC output voltage responsive to the new value of the control voltage.

BRIEF DESCRIPTION OF THE DRAWINGS

FIG. 5 is a flow chart for the line sync interrupt routine for the main routine shown in FIG. 4;

FIG. 6 is a flow chart for a gate pulse interrupt routine for the main routine shown in FIG. 4; and FIGS. 7A-7F are graphical representations of various aspects of operation of a circuit made in accordance with the present invention.

BEST MODE FOR CARRYING OUT THE INVENTION

Figure 1:
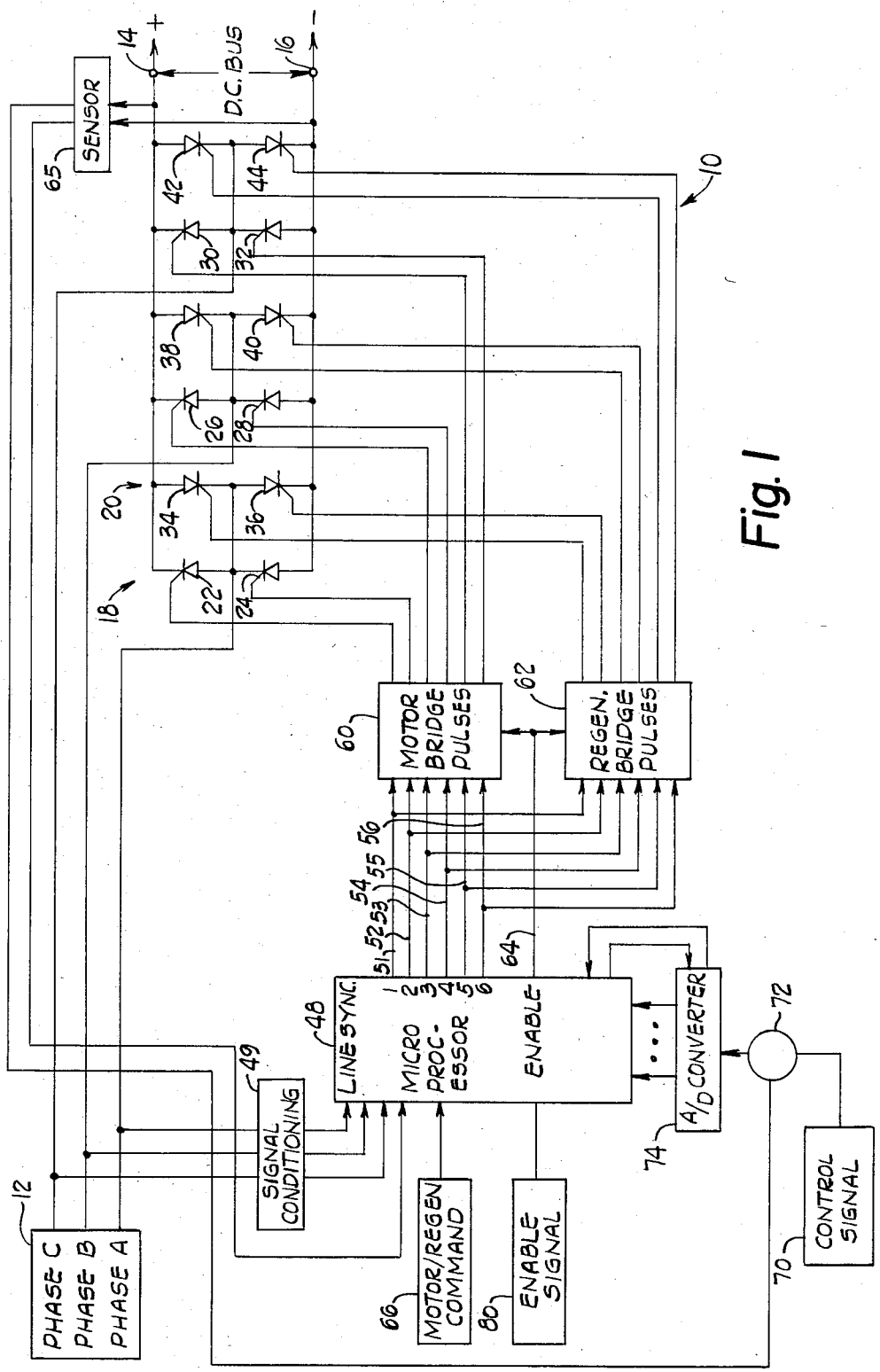
FIG. 1 is a block diagram of a circuit made in accordance with the present invention.

Referring now to the drawings and particularly to FIG. 1, a converter circuit 10 receives a three-phase AC signal from a source of AC electrical energy 12 and converts it into DC electrical energy which is present as a DC signal across terminals 14, 16. This type of converter circuit can be utilized as a front end portion of an inverter circuit with the output terminals 14, 16 of the converter being connected to the input of the inverter circuit. The inverter circuit would invert the DC voltage into a polyphase AC signal with an output level that is dependent on the DC input level. Also, the converter circuit 10 can be utilized to drive a DC load such as a motor or the like.

A converter bridge 18 and a regenerative bridge 20 are operatively connected to the AC source 12. The converter bridge 18 comprises six SCR's wired in three, series pairs. In particular, SCR's 22, 24 are operatively connected in series with their junction connected to phase A of source 12. SCR's 26, 28 are connected in series with their junction operatively connected to phase B of source 12. SCR's 30, 32 are operatively connected in series with their junction connected to phase C of source 12. The three pairs of SCR's 22-32 are operatively connected in parallel to the DC output terminals 14, 16. The gates of SCR's 22-32 are operatively connected to a control circuit which controls the conduction state of each SCR. As those skilled in the art will appreciate, the SCR's are driven by pairs into conduction at various times during the cycle of the AC energy from the source 12 and a resultant DC output voltage is produced.

Figures 2, 3A, 3B:
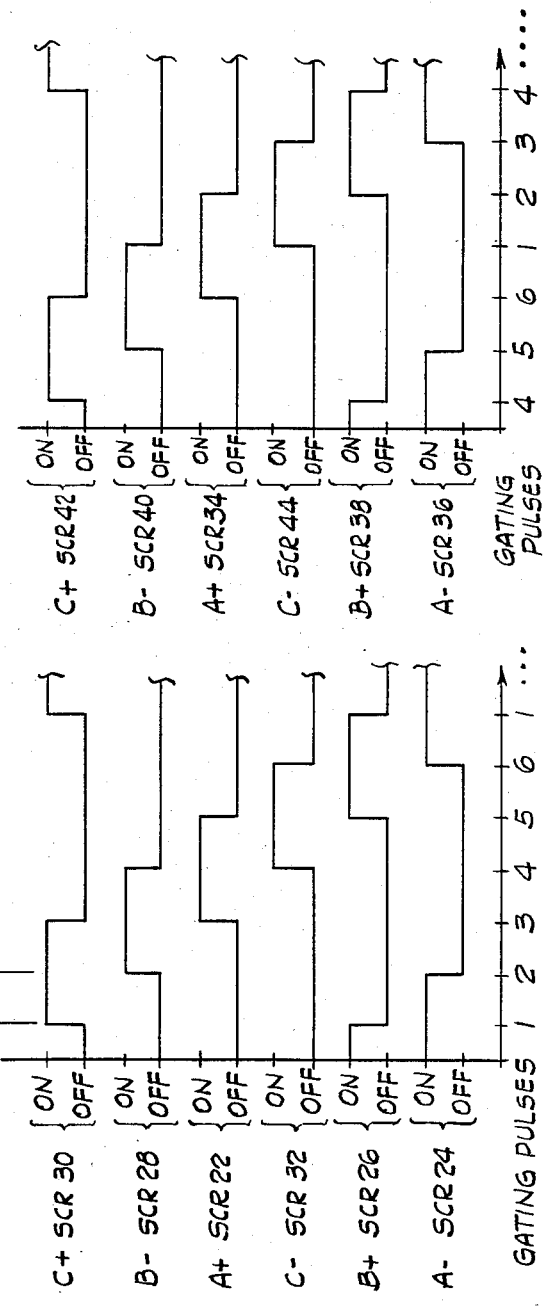
FIG. 2 is a graphical representation of a three phase AC electrical energy signal.
FIG. 3A is a graphical representation of the conduction states of switching devices in a converter mode as a function of the gating pulse sequence.
FIG. 3B is a graphical representation of the conduction states of switching devices in a regenerative mode as a function of the gating pulse sequence.

Referring now to FIGS. 2 and 3A, a firing pattern for the SCR's is shown that will generate the maximum DC output level. When the SCR's 22-32 are gated, AC electrical energy is converted into DC electrical energy. FIG. 2 represents the AC signal from source 12. FIG. 3A represents the conduction states of the SCR's 22-32. If the particular firing sequence shown in FIG. 3A were to be transposed by an angle alpha shown in FIG. 2, a lower value DC voltage will be present at the output terminals 14, 16. The theory and operation of these types of converter circuits are fully explained in *Principals of Inverter Circuits* by Bedford, B.D. and Hoft, R.G. (New York, John Wiley & Sons, 1964), pgs. 55-88, which is fully incorporated herein by reference.

A regenerative bridge 20 (FIG. 1) comprises three, series pairs of SCR's connected in parallel to the source 12. In particular, SCR's 34, 36 are operatively connected in series with their junction connected to phase A of source 12. SCR's 38, 40 are operatively connected in series with their junction being operatively connected to phase B of source 12. SCR's 42, 44 are operatively connected in series with their junction being operatively connected to phase C of source 12. The three pairs of SCR's 34-44 are operatively connected in parallel to the DC output terminals 14, 16. It will be apparent from FIG. 1 that the polarity of the converter bridge SCR's 18 are opposite that of the regenerative bridge SCR's 20. FIGS. 2 and 3B show the firing pattern for regenerative SCR's 34-44. The operation of such a regenerative bridge switching system is well known in the art and will not be described in detail herein.

A controller 48 is provided and is operatively connected to the three phases of the AC electrical energy source 12 through a signal conditioning network 49. The controller unit is preferably a microprocessor. Six firing pulses or gating pulses 51-56 are generated by the microprocessor 48. These six gating pulses are designated as 1-6 within the microprocessor and occur or are outputed in pairs as can be seen from FIGS. 3A and 3B. Each of the gating pulse signals is operatively connected to a motor bridge pulse circuit 60 and a regenerative bridge pulse circuit 62.

An enable signal 64 from the microprocessor 48 is operatively connected to the motor bridge pulse circuit 60 and a regenerative bridge pulse circuit 62. The enable signal 64 controls whether the gating pulses will pass to the gates of the SCR's in the converter bridge 18 or to the gates of the SCR's in the regenerative bridge 20.

Assuming the desire is to have the circuit 10 operate in the converter mode, the motor bridge pulse circuit 60 will be enabled and the microprocessor controls the SCR's 22-32. When the regenerative mode is desired, the enable signal 64 will enable the regenerative bridge pulse circuit 62 and the microprocessor controls SCR's 34-44.

It is contemplated that the enable signal 64 is a digital signal which takes the well known states of either HIGH or LOW. It will be appreciated that under one specific scheme, the motor bridge pulse circuit 60 is enabled when 64 is HIGH and the regenerative bridge pulse circuit 62 is enabled when 64 is LOW. The enable function can be the opposite of this scheme. In this manner, one of the bridge circuits 60 or 62 is always enabled since the enable signal 64 is always either HIGH or LOW.

A sensor 65 is operatively connected across the DC output terminals 14, 16. The sensor 65 monitors the current at the DC output terminals 14, 16. The current present at the DC output terminals is transmitted to the microprocessor 48. The motor/regenerative command circuit 66 commands the operating mode of the microprocessor 48.

When transferring from a motoring mode to a regenerative mode, a precaution must be exercised to preclude the regenerative bridge circuit 62 from being enabled until the current from the motoring bridge has gone to zero.

To accomplish this, the microprocessor first terminates gate pulses to the motoring SCR's 22-32. When the sensor 65 indicates zero current, it signals the microprocessor which then enables the regenerative bridge pulse circuit 62. When transferring from the regenerative mode to the motoring mode, the microprocessor initiates gating pulses to occur that force discontinuous current. Once discontinuous current is sensed by sensor 65, the microprocessor then changes the state of the enable signal 64 and the regenerative bridge circuit 62 is disabled and the motoring bridge circuit 60 is enabled.

An analog control signal 70 is provided to control the level of the DC output voltage at terminals 14, 16. The control signal 70 is operatively connected to a processing circuit 72. The sensor 65 is operatively connected to the processing circuit 72. The processing circuit sums the integrals of each of the current from the sensor 65 and the control signal 70 and generates an analog fire angle reference signal which is operatively connected to an A/D converter 74. The A/D converter converts the analog firing angle reference signal into a digital signal which is operatively connected to the microprocessor 48.

An enable signal 80 is operatively connected to the microprocessor 48 for controlling the overall enable of the microprocessor.

Figure 4:
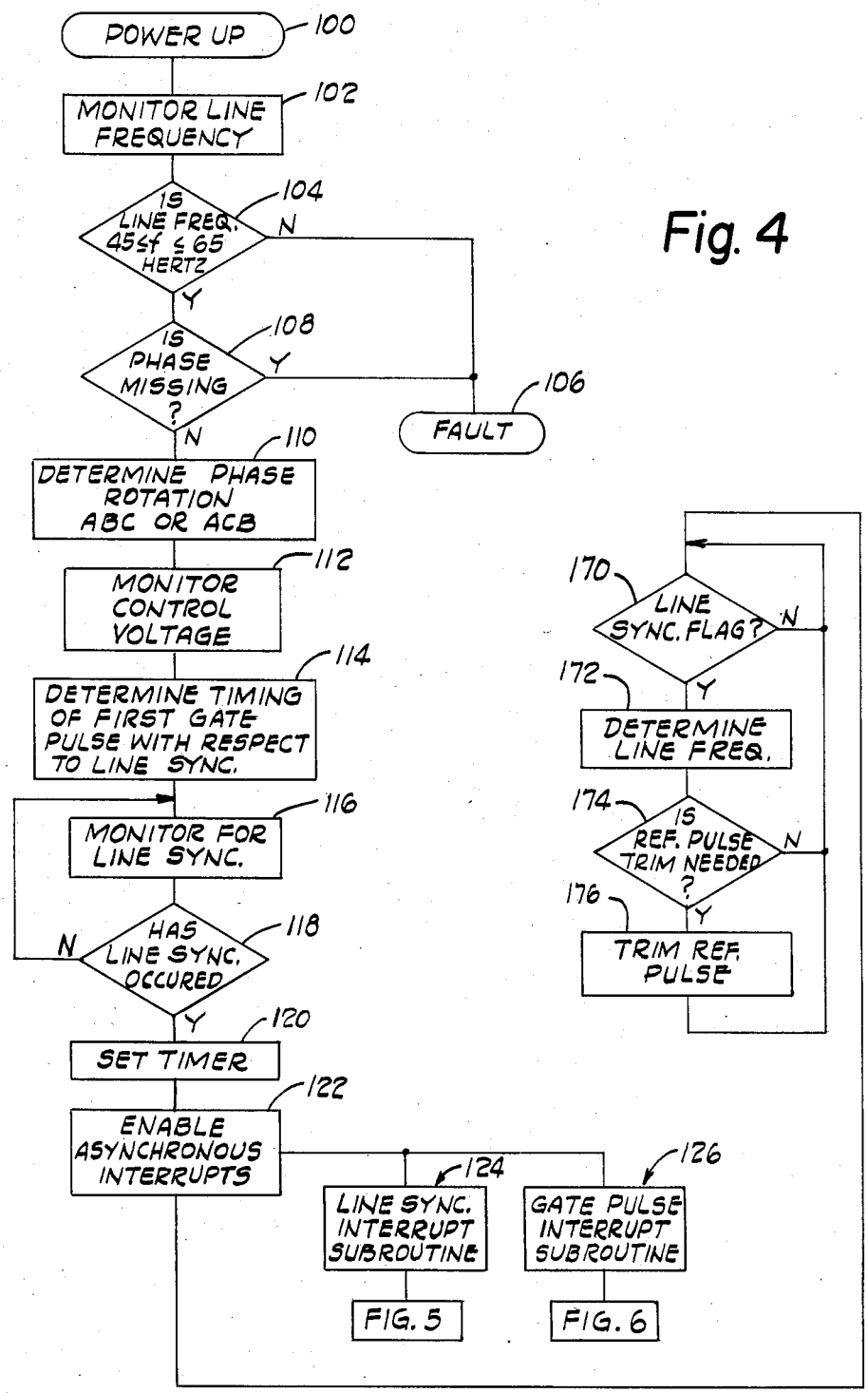
FIG. 4 is a flow chart of the steps for a main control routine in accordance with the present invention.

Referring now to the flow charts shown in FIGS. 4-6, the operation of the invention will be better appreciated. The first step 100 in the operation process is to power-up the microprocessor by applying a supply voltage to the microprocessor. This power up of the microprocessor is accomplished by applying power in the form of the supply voltage to the microprocessor. Upon the application of power to the microprocessor, the microprocessor enters an initialization routine. Referring to steps 102 and 104 of the flow chart, the microprocessor monitors the line frequency of the AC source 12 and determines whether the line frequency is between 45 hertz and 65 hertz. If the line frequency is not within this range, the program then branches off and signals a fault indication to the operator in step 106. If the line frequency is between these limits, the program branches to the next step 108 which is to determine whether any of the phases of the AC source are missing. If any of the three phases are missing, the program branches off to give a fault indication in step 106. If all these phases are present the program branches to the next step 110 which is to determine the phase rotation of the AC source.

As those skilled in the art will appreciate, phase rotation of the AC source can occur which would change a phase pattern, for example, from ABC to a phase pattern of ACB. The microprocessor, after monitoring the phase rotation, determines correct sequencing of the gating pulse pairs to the bridge networks. It will be appreciated that such a determination of phase rotation and automatic adjustment of the gate pulse pair pattern makes the converter system insensitive to phase rotation. FIGS. 2 and 3A show the gate pulse pattern for an ABC phase rotation for the motoring mode. FIGS. 2 and 3B show the gate pulse pattern for an ABC phase rotation for the regenerative mode.

After the phase rotation has been determined, the next step 112 is for the microprocessor to monitor the firing angle reference signal from the processing circuit 72. The resultant analog firing angle reference signal, which is dependent upon the control signal 70 and the signal from the sensor 65, is outputted to the A/D converter 74 where it is converted into digital information. The microprocessor 48 reads the digitized information from the A/D converter 74.

After determining the phase rotation of the AC source and reading the firing angle reference signal, the microprocessor determines or calculates in step 114 the timing that would be required to generate the first gating pulse after one of the AC source phases crosses through zero. The calculation of the timing to the first gating pulse is also based on the frequency of the AC source 12 and the level of the firing angle reference signal. By way of a specific example, the system can be designed in which a firing angle reference signal from the processing circuit 72 equaling 5 volts DC causes delay angle $\alpha$, shown in FIG. 2, to equal 0° and a firing angle reference signal equaling 0 volts DC causes the delay angle $\alpha$ to equal 150°. Assuming a linear relationship between changes in the firing angle reference signal ($\Delta$FARS) and changes in the delay angle ($\Delta\alpha$), each 1 volt change in FARS cause 30° delay in $\alpha$. If the AC input voltage equals 460 volts AC RMS, the DC output voltage will equal approximately 600 volts DC when $\alpha$ is equal to 0° and approximately 0 volts DC when $\alpha$ is equal to 120°. Again, assuming a linear relationship between $\Delta$FARS and the DC output voltage, each 1 volt change in the FARS is equal to approximately a 150 volt DC change in the output voltage. The microprocessor monitors the firing angle reference signal and calculates the change if necessary to be responsive to the firing angle reference signal.

It will be appreciated that the microprocessor monitors and automatically compensates for the AC source frequency. A cycle of the AC source is equal to 360°. If the frequency is 60 Hertz, a cycle takes approximately 16.67 milliseconds and each 1° of a cycle is equal to 16.67/360 or 0.0462 milliseconds. If the freqency is 55 Hertz, a cycle takes approximately 18.18 milliseconds and each 1° of a cycle is equal to 18.18/360 or 0.0505 milliseconds. By way of a specific example, assume that the firing angle reference signal decreases by 1 volt. The microprocessor, from the above example, would delay the next gate pulse by 30°. If the AC source frequency is 60 Hertz, the delay would be approximately equal 1.386 milliseconds. If the AC source frequency is 55 Hertz, the delay would be approximately equal to 1.515 milliseconds.

The microprocessor 48 monitors only one of the three phases of the AC source for zero crossing from negative to positive and defines that occurrence as a line sync. All gating pulses are based from the occurrence of the line sync. For example, FIG. 1 shows phase A as being the line sync although any of the other two phases can also be used as the line sync.

In step 116, the microprocessor monitors the selected phase for a line sync to occur. The microprocessor in step 118 makes a determination whether or not the line sync has in fact occurred. If no line sync has occurred, the program branches back to step 116 and continues to monitor the selected phase line.

When a line sync does occur, a single internal timer is set in step 120 to the calculated time of occurrence for the first gate pulse pair. After the timer is set, two internal asynchronous interrupt subroutine programs are enabled in step 122. The two asynchronous interrupt programs are the line sync interrupt subroutine 124 and the gate pulse interrupt subroutine 126.

Referring now to FIG. 5, the line sync interrupt program 124 is enabled with step 122 of the main routine. Whenever a line sync occurs, the line sync interrupt subroutine automatically interrupts the main program shown in FIG. 4 and the line sync subroutine 124 is performed. Step 128 begins the subroutine program when the line sync occurs. Step 130 is to measure the time from the last occurrence of a line sync. Step 132 is to reset a memory location in the microprocessor that stores the total running or elapsed time between line sync occurrences. Step 134 is to set a line sync flag which is an indication to the main routine that a line sync has occurred. Step 136 is to return to the main program. The line sync interrupt routine is performed only once per cycle of the AC source.

The gate pulse interrupt subroutine program 126 (FIG. 6) automatically interrupts the main routine program whenever a gate pulse to the bridge network is to occur. Since there are six gate pulse pairs per cycle of the AC source and one line sync per cycle, the gate pulse interrupt program interrupts the main routine six times per cycle or per line sync interrupt.

Step 140 initiates the program and interrupts the main program when a gate pulse is to occur. The timing of the first gating pulse pair was determined and set in step 114 of the main routine. When the line sync occurs, the timer starts to count down. When the count reaches zero, the gate pulse interrupt subroutine is initiated. Step 142 starts the gate pulse and step 144 ends the gate pulse. Step 146 updates the running total memory location for the timer that is totaling the elapsed time between line syncs. Step 148 monitors the command signal from circuit 66 to determine whether the system is to output motor gate pulses to gate the motor bridge, regenerative gate pulses to gate the regenerative bridge or is to output no pulses. This step also insures that the system is enabled and determines the state of the converter current.

Step 150 is a completely internal step within the microprocessor. This step simply calls up the proper firing sequence from a memory location that produces motor, regenerative, or no pulses to the bridge network depending on the state of the command circuit 66. Those skilled in the art will appreciate that the sequence of gating pulses to the bridges is different for the different modes of operation and is also different depending upon the monitored phase rotation.

Step 152 is to do an A/D conversion of the firing angle reference signal which is a summation and integration of the control signal and the feedback signal from the sensor 65. Step 154 is the monitoring of the firing angle reference signal by the microprocessor. Depending upon the reading of the firing angle reference signal, an adjustment will be made in step 156 to control the time that lapses before the next gate pulse interrupt to reflect changes in the firing angle reference signal. After the timer is set to the next gate pulse interrupt, the single timer again starts counting down. When the timer counts down to zero, the gate pulse interrupt subroutine occurs automatically and the next gate pulse pair is generated. As those skilled in the art will appreciate, the system makes adjustments in response to changes in control voltage and/or the firing angle reference signal within the occurrence of one gate pulse pair. Step 158 returns the program back to the main program routine.

Step 170 of the main program is to determine whether a line sync flag has been set which occurred from step 134 of the line sync interrupt subroutine. If no line sync has occurred and therefore no line sync flag been set, the system branches off into a closed loop and waits for a line sync to occur before proceeding. When a line sync does occur, the program branches off and in step 172 determines what the line frequency is of the AC source.

One of the gating pulses is utilized as a reference pulse by the microprocessor. When this reference gate pulse is generated, the actual time is measured between the occurrence of a line sync and the occurrence of the reference gate pulse.

Step 174 of the main program is to determine or calculate whether or not any trim is needed for the reference pulse due to drift caused by perimeter variations that occur within the system such as temperature affects upon components, etc. If it is determined that no trim is needed, the program branches off to wait for the next line sync flag in step 170. If trim is required because there is a difference between the measured time of occurrence of the reference pulse and the calculated time, the necessary adjustments to the reference pulse are made in step 176. The program is then returned back to step 170 to wait for the next line sync occurrence. Trim, therefore, occurs once every cycle if needed.

Referring now to FIGS. 7A through 7F a graphical representation of the operation of the present invention is shown. Time $t_0$ represents the location at which the Y axis crosses the X axis in a typical Cartesian coordinate system. Gate pulse pairs occur six times for each cycle of the AC energy. A cycle of the AC energy can be divided into 360°. This means that a gate pulse pair would be generated every 60° if the control voltage remains constant and no other system parameters vary.

Therefore, FIG. 7A has increments marked on its X axis which represent 60° intervals or 1/6th of a cycle.

FIG. 7A is a graphical representation of the control voltage as a function of cycle time. It is assumed that the firing angle reference signal has remained constant over the past several gate pulse steps. Time $t_1$ represents the sixth gate pulse pair in a sequence. At time $t_2$ the microprocessor reads the conversion of the A/D converter 74 (FIG. 7D). At this time, the firing angle reference signal (FARS) has not changed. Therefore, the next gate pulse pair occurs 60° from the last gate pulse pair which is at time $t_3$. Also, at time $t_3$ a sync pulse occurs which can be seen in FIG. 7C. It is to be understood that the occurrence of the sync pulse is not necessarily synchronous with the occurrence of a gate pulse pair but has been selected as such for explanation purposes.

At time $t_4$ the microprocessor again reads the A/D conversion from the A/D converter 74. However, the firing angle reference signal has changed by an amount $-\Delta FARS$. Since the firing angle reference signal has changed by an amount $-\Delta FARS$, the microprocessor will shift the spacing between the gate pulse pairs to output a voltage from the bridge network commensurate with the new firing angle reference signal. To do this change, the timing to the occurrence of the next gate pulse pairs must be changed. FIG. 7D represents the timer countdown between gate pulse pairs. The timing ramp which represents the counting down of the internal timer to the time of the next gate pulse pair is, in essence, set back so that it will count down to zero at an appropriate time to change the output voltage commensurate with the FARS change. A change in the FARS by an amount equal to $-\Delta FARS$ will decrease the output voltage at terminals 14, 16. To decrease the voltage, the microprocessor 48 must delay the gate pulses by an amount equal to $+f(\Delta FARS)$. As can be seen from FIGS. 7D and 7A, the correction occurs at time $t_5$. A gate pulse pair, which can be seen in FIG. 7E, occurs when the timing ramp shown in FIG. 7D counts down to zero. Had there been no change in the FARS, the next gate pulse pair would have occurred at time $t_6$. Because the correction is automatically made by the microprocessor, the gate pulse pair occurs at time $t_7$ which is equal to 60° $+f(\Delta FARS)$.

At time $t_8$ the microprocessor again reads the A/D conversion from the A/D converter 74. Since there has been no change in the FARS from the last reading which occurred at time $t_4$, the next gate pulse pair occurs 60° from the last gate pulse pair. Those skilled in the art will appreciate that all the gate pulse pairs are skewed by an amount equal to $+f(\Delta FARS)$ where $\Delta FARS$ is the change in the firing angle reference and a function of this signal is used to determine the amount of time change which is represented by a voltage change. It can be seen that the countdown ramp shown in FIG. 7D counts down as before without any correction factor so that the next gating pulse pair occurs 60° from the last gating pulse pair. At time $t_9$, the system again reads the signal from the A/D converter 74 and once again, because there has been no FARS change, a gate pulse pair is generated 60° from the last gate pulse pair.

At time $t_{10}$, the microprocessor again reads the signal from the A/D converter 74. It will be seen from FIG. 7A that the FARS has increased by an amount equal to $+\Delta FARS$. In this particular example, the original decrease in FARS is equal to the increase in FARS so that the result of FARS level is the same as it was before the initial decrease. Since an increase in the FARS occurred at time $t_{10}$, the microprocessor automatically compensates so that the next gate pulse pair will change the output voltage at the converter terminals 14, 16 which is a function of the increase in the FARS. To accomplish this, the countdown timer is again adjusted so that it count downs to zero at the appropriate time and output the next gate pulse pair and thus make the adjustment.

It can be seen from FIG. 7D at time $t_{11}$ the timer is adjusted so that the time will count down to zero at time $t_{12}$ and generate the next gate pulse pair. It can be noted from FIG. 7E that the time between the gate pulse pairs that occurred at time $t_{10}$ and the one that occurred at time $t_{12}$ is equal to 60° $-f(\Delta FARS)$ where $\Delta FARS$ is the change in the firing angle reference and a function of this signal is used to determine the amount of time change which is represented by a voltage. In the present case, a one volt change in FARS results in a 30 degree change in the firing of the pulses. The time per degree is a function of line frequency and if FARS changed by one volt, then the next SCR would be fired 60 degrees later plus or minus 30 degrees.

At time $t_{13}$, the microprocessor again reads the signal from the A/D converter 74. Since no change in the FARS occurred from the last reading of the A/D converter, the next gate pulse pair occurs 60° from the last gate pulse pair. At time $t_{14}$, the microprocessor reads the signal from the A/D converter and since there has not been any change in the FARS from the last reading, the next gate pulse pair occurs 60° from the last gate pulse pair.

The running total of time between line syncs is kept track of by the microprocessor and can be seen in FIG. 7F. At time $t_3$, the total was reset since a line sync occurred. At time $t_{14}$, a new line sync occurs and the running total time is reset and the first gate pulse pair of the next cycle occurs. It is this total running time that is utilized as the measurement in step 130 of FIG. 5 and is reset in step 132.

From the foregoing, it should be apparent that a new and improved method and apparatus for converting an AC electrical signal into a DC electrical signal has been provided. The new and improved method for controlling the conversion of the AC electrical energy into DC electrical energy includes providing a switching means adapted to be operatively coupled to the AC electrical energy, the switching means including output terminals for the DC electrical energy. Also provided is a control means adapted to be operatively coupled to the switching means and responsive to the AC electrical energy. A control signal is established and directed to the controlling means indicative of a desired DC energy level. The control signal is sensed by the controlling means a predetermined number of times during a cycle of the AC electrical energy. Timing of gating signals for the switching means are determined responsive to the control signal and responsive to the AC electrical energy. Gating signals are generated by the controlling means responsive to the determined timing and to the AC electrical energy to control conduction states of the switching means to produce a controllable DC electrical energy level.

The new and improved apparatus provided for converting AC electrical energy into DC electrical energy comprises a switching means adapted to be operatively coupled to the AC electrical energy, the switching means including a DC electrical energy output. A controlling means is adapted to be operatively coupled to the switching means and responsive to the AC electrical energy for controlling conduction states of the switching means. The controlling means receives a control signal, determines timing of the gating pulses responsive to the control signal and to the AC electrical energy and generates gating pulses to the switching means responsive to the determined timing and the AC electrical energy to produce a controllable DC electrical energy level.

Possible modifications and variations of the invention will be apparent to those skilled in the art from the foregoing detailed disclosure. Therefore, it is to be understood that within the scope of the appended claims the invention can be practiced otherwise than is specifically shown or described.

I claim:

1. A method for controlling the conversion of AC electrical energy into DC electrical energy by controllably switching on and off the AC electrical energy source comprising the steps of:
    (a) switching the AC electrical energy source on and off for outputting said DC electrical energy;
    (b) controlling the switching of the AC electrical energy source in response to the AC electrical energy source;
    (c) generating a control signal to control the switching of the AC electrical energy source to output a desired value of DC electrical energy;
    (d) sensing said control signal a predetermined number of times during a cycle of the AC electrical energy source;
    (e) periodically sensing frequency of said AC electrical energy source;
    (f) determining the timing of gating signals for switching said AC electrical energy source on and off responsive to said periodically sensed frequency of said AC electrical energy source and to said control signal to produce a controllable DC electrical energy level; and
    (g) generating said gating signals responsive to said determined timing of gating signals to control said switching of said AC electrical energy source.

2. A method for controlling the conversion of AC electrical energy into DC electrical energy by controllably switching on and off the AC electrical energy source comprising the steps of:
    (a) switching the AC electrical energy source on and off for outputting said DC electrical energy;
    (b) controlling the switching of the AC electrical energy source in response to the AC electrical energy source;
    (c) generating a control signal to control the switching of the AC electrical energy source to output a desired value of DC electrical energy;
    (d) sensing said control signal a predetermined number of times during a cycle of the AC electrical energy source;
    (e) periodically sensing frequency and phase rotation of said AC electrical energy source;
    (f) determining the timing of gating signals for switching said AC electrical energy source on and off responsive to said periodically sensed frequency of said AC electrical energy source and to said control signal to produce a controllable DC electrical energy level; and
    (g) generating said gating signals responsive to said determined timing of gating signals in a sequence responsive to said sensed phase rotation of said AC electrical energy source to control said switching of said AC electrical energy source.

3. A method for controlling the conversion of electrical energy from an AC electrical energy source for driving a load having regenerative capabilities and which is operable to generate current and direct the current flow from the load to the AC electrical energy source comprising the steps of:
    (a) switching the AC electrical energy source on and off to provide current flow to said load;
    (b) switching the current flow from said load to said AC electrical energy source when said load is generating current;
    (c) controlling said switching of said current flow from said AC electrical energy source to said load and from said load to said AC electrical energy source responsive to said AC electrical energy source;
    (d) sensing the current flow to and from said load;
    (e) sensing the frequency of said AC electrical energy source and determining if it is within predetermined limits;
    (f) signaling a fault indication if said sensed frequency is not within said predetermined limits;
    (g) sensing the phases of said AC electrical energy source and determining if all phases are present;
    (h) signaling a fault indication if all phases of said AC electrical energy source are not present;
    (i) sensing phase rotation of said AC electrical energy source;
    (j) establishing system synchronization from one phase of said AC electrical energy source when such one phase of said AC electrical energy source crosses through a predetermined value;
    (k) generating a control signal indicative of a desired value of DC electrical energy from said AC electrical energy source to said load;
    (l) calculating the timing of a first gating pulse to switch said AC electrical energy source after the occurrence of system synchronization responsive to the frequency of said AC electrical energy source and said control signal;
    (m) generating a gating pulse sequence responsive to said sensed phase rotation;
    (n) monitoring said AC electrical energy source for an occurrence of system synchronization;
    (o) measuring the calculated time to the occurrence of said first gate pulse after system synchronization occurs;
    (p) generating said first gate pulse when said calculated time has elapsed;
    (q) generating a command signal to control said switching of said current flow to and from said load;
    (r) monitoring the value of said control signal;
    (s) calculating timing to the next gating pulse responsive to frequency and phase rotation of said AC electrical energy and said control signal;
    (t) measuring the time calculated in step s; and
    (u) generating a next gating pulse when said calculated time of step (s) has elapsed.

4. The method of claim 3 further comprising the step of:
    (v) repeating steps (q) through (u) a predetermined number of times.

5. The method of claim 4 further comprising the steps of:

(w) monitoring the AC electrical energy source for occurrence of a subsequent system synchronization;

(x) measuring the time between the occurrence of the monitored system synchronization of step (w) and the previous occurrence of a system synchronization;

(y) sensing line frequency from the measured time in step (x);

(z) calculating the time between system synchronization and a preselected gating pulse;

(aa) measuring the time between said system synchronization and the occurrence of said preselected pulse, and (ab) adjusting the timing of the occurrence of said preselected gating pulse to occur at the time calculated in step (z).

6. An apparatus for converting AC electrical energy into DC electrical energy comprising:

switching means coupled to an AC electrical energy source for converting said AC electrical energy to DC electrical energy, said switching means having DC output terminals and gating control means to control conduct states of said switching means;

sensing means coupled to said AC electrical energy source for periodically sensing phase rotation and frequency of said AC electrical energy source;

generating means for establishing a control signal indicative of a desired level of said DC electrical energy;

receiving means for receiving said control signal that establishes a desired level of said DC electrical energy; and control means coupled to said sensing means, said receiving means and said switching means for determining sequencing and timing of gate pulses directed to said switching means response to said control signal to establish a controllable DC energy level independent of variations in phase rotation and frequency of said AC electrical energy.

7. A method for controlling the conversion of AC electrical energy to DC electrical energy by controllably switching on and off the AC electrical energy source comprising the steps of:

(a) switching the AC electrical energy source on and off to control the DC electrical energy outputted;

(b) generating a control signal indicative of a desired DC electrical energy level;

(c) derving timing of gating pulses to switch said AC electrical energy source to produce a desired controllable DC electrical energy responsive to said control signal and to said AC electrical energy source;

(d) generating gating pulses to switch said AC electrical energy source responsive to said derived timing of gating pulses and responsive to said AC electrical energy source and said control signal;

(e) periodically sensing the frequency of said AC electrical energy source; and (f) adjusting the timing of daid gate pulses responsive to said periodically sensed frequency.

8. A method for controlling the conversion of electrical energy from an AC electrical energy source for driving a load having regenerative capabilities and which is operable to generate current and direct the current flow from the load to the AC electrical energy source comprising the steps of:

(a) switching the AC electrical energy source on and off to provide current flow to said load;

(b) switching the current flow from said load to said AC electrical energy source when said load is generating current;

(c) controlling said switching of said current flow from said AC electrical energy source to said load and from said load to said AC electrical energy source responsive to said AC electrical energy source;

(d) sensing the current flow to and from said load;

(e) sensing the frequency of said AC electrical energy source;

(f) generating gating signals responsive to determined timing of gating signals to control said switching; and (g) determining the timing of said gating signals responsive to said sensed frequency of said AC electrical energy source.

9. A method for controlling the conversion of electrical energy for driving a load having regenerative capabilities and which is operable to generate current and direct the current flow from the load to the AC electrical energy source comprising the steps of:

(a) switching the AC electrical energy source on and off to provide current flow to said load;

(b) switching the current flow from said load to said AC electrical energy source when said load is generating current;

(c) controlling said switching of said current flow from said AC electrical energy source to said load and from said load to said AC electrical energy source responsive to said AC electrical energy source;

(d) sensing the current flow to and from said load;

(e) sensing phase rotation of said AC electrical energy source;

(f) generating gating signals responsive to determined timing of gating signals in a sequence responsive to said sensed phase rotation of said AC electrical energy source to control said switching; and (g) determining the timing of said gating signals controllable DC electrical energy level.

10. A circuit for converting AC electrical energy into DC electrical energy for powering a load having regenerative capabilities, said circuit comprising:

converting switching means adapted to be coupled to an AC electrical energy source and to said load;

regenerative switching means adapted to be coupled to said AC electrical energy source and said load;

controlling means adapted to be coupled to said AC electrical energy source, said converting swtiching means and said regenerative switching means for controlling conduction states of said converting switching means and said regenerative switching means;

said controlling means receiving a control signal from a suitable source, determining timing of gating pulses respnsive to said control signal and responsive to said AC electrical energy source and generating gating signals responsive to said determined timing and responsive to said AC electrical energy source and to at least one of said converting switching means or to said regenerative switching means to control conduction states thereof; and sensing means adapted to be coupled to said load and said controlling means for sensing current flow between said AC electrical energy source and said load and for generating a signal to said controlling means indicative thereof;

said controlling means not switching gating signals from one switching means to another switching means until the sensed current achieves a predetermined condition.

* * * * *